United States Patent
Yamazaki et al.

(10) Patent No.: US 11,471,836 B2
(45) Date of Patent: Oct. 18, 2022

(54) REPAIR METHOD FOR SEPARATION MEMBRANE AND METHOD FOR MANUFACTURING SEPARATION MEMBRANE STRUCTURE

(71) Applicant: NGK INSULATORS, LTD., Nagoya (JP)

(72) Inventors: Shinichiro Yamazaki, Nagoya (JP); Takeshi Hagio, Inazawa (JP); Kenichi Noda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/972,687

(22) Filed: May 7, 2018

(65) Prior Publication Data

US 2018/0250639 A1    Sep. 6, 2018

Related U.S. Application Data

(63) Continuation of application No. PCT/JP2016/081077, filed on Oct. 20, 2016.

(30) Foreign Application Priority Data

Nov. 18, 2015  (JP) ............... JP2015-225299

(51) Int. Cl.
*B01D 65/10* (2006.01)
*B01D 69/10* (2006.01)
(Continued)

(52) U.S. Cl.
CPC ....... *B01D 65/108* (2013.01); *B01D 67/0088* (2013.01); *B01D 69/10* (2013.01); *B01D 71/028* (2013.01)

(58) Field of Classification Search
CPC .. B01D 65/108; B01D 67/0088; B01D 69/10; B01D 71/02; B01D 71/021; B01D 71/028
See application file for complete search history.

(56) References Cited

U.S. PATENT DOCUMENTS 6,177,373 B1 *  1/2001  Sterte .............. B01D 67/0051
                                                       502/4
9,782,729 B2 *  10/2017  Miyahara ........... B01D 71/028
(Continued)

FOREIGN PATENT DOCUMENTS

JP    2000-507909 A1    6/2000
JP    2003-290636 A1    10/2003
(Continued)

OTHER PUBLICATIONS

International Search Report and Written Opinion (Application No. PCT/JP2016/081077) dated Dec. 13, 2016.
(Continued)

*Primary Examiner* — Michael P Wieczorek
(74) *Attorney, Agent, or Firm* — Burr & Brown, PLLC (57) ABSTRACT

A repair method for a separation membrane including a step of applying a colloidal solution to a surface of a separation membrane formed on a support. The colloidal solution has a predetermined pH. In colloidal solution, repair material particles are dispersed in an aqueous solvent. The repair material particles have an electrical charge that is opposite to an electrical charge of the support at the predetermined pH.

8 Claims, 3 Drawing Sheets

(51) Int. Cl.
    *B01D 67/00*       (2006.01)
    *B01D 71/02*       (2006.01)

(56) References Cited

U.S. PATENT DOCUMENTS

| | | |
|---|---|---|
| 2008/0009308 A1 | 1/2008 | Bar et al. |
| 2009/0090241 A1 | 4/2009 | Julbe et al. |
| 2011/0036754 A1 | 2/2011 | Cheng et al. |
| 2015/0136676 A1* | 5/2015 | Helm .................. B01D 65/108 |
| | | 210/232 |
| 2015/0224451 A1 | 8/2015 | Miyahara et al. |
| 2016/0016125 A1 | 1/2016 | Uchikawa et al. |

FOREIGN PATENT DOCUMENTS

| | | | |
|---|---|---|---|
| JP | 2005-288266 A1 | 10/2005 | |
| JP | 2009-520594 A1 | 5/2009 | |
| JP | 2010-506700 A1 | 3/2010 | |
| JP | 2010-511512 A1 | 4/2010 | |
| JP | 2011-016114 A1 | 1/2011 | |
| JP | 2013-059714 A1 | 4/2013 | |
| WO | 2014/069676 A1 | 5/2014 | |
| WO | WO-2014069676 A1 * | 5/2014 | ........... B01D 71/028 |
| WO | 2014/156579 A1 | 10/2014 | |

OTHER PUBLICATIONS

English translation of International Preliminary Report on Patentability (Application No. PCT/JP2016/081077) dated May 31, 2018.

\* cited by examiner

REPAIR METHOD FOR SEPARATION MEMBRANE AND METHOD FOR MANUFACTURING SEPARATION MEMBRANE STRUCTURE

BACKGROUND OF THE INVENTION

1. Field of File Invention

The present invention relates to a repair method for a separation membrane and to a method for manufacturing a separation membrane structure.

2. Description of Related Art

A typical method for repairing a defect in a zeolite membrane has been proposed in which a sol containing an organic-inorganic hybrid silica (referred to below as "repair material") flows onto a surface of the zeolite membrane (reference is made to PCT Laid Open Application 2014/156579).

It is possible to improve the separation performance of a zeolite membrane since the method covers a defect with the repair material that flows into the defect in the zeolite membrane.

SUMMARY OF THE INVENTION

However since the method disclosed in Patent Literature 1 uses the force of the naturally occurring flow of the repair material into a defect, there is a risk that a portion of the defect will remain. Therefore there is a need for further improvement of the separation performance of a separation membrane.

The present invention is proposed based on the new insight above, and has the object of providing a repair method for a separation membrane and to a method for manufacturing a separation membrane structure that enables improvement of the separation performance of a separation membrane.

Solution to Problem

A repair method for a separation membrane according to the present invention includes a step of applying a colloidal solution to a surface of a separation membrane formed on a support. The colloidal solution has a predetermined pH. In colloidal solution, repair material particles are dispersed in an aqueous solvent. The repair material particles have an electrical charge that is opposite to an electrical charge of the support at the predetermined pH.

Advantageous Effects of Invention

The present invention provides a repair method for a separation membrane and to a method for manufacturing a separation membrane structure that enables improvement of the separation performance of a separation membrane.

DETAILED DESCRIPTION OF THE INVENTION

Structure of Separation Membrane Structure

Figure 1:
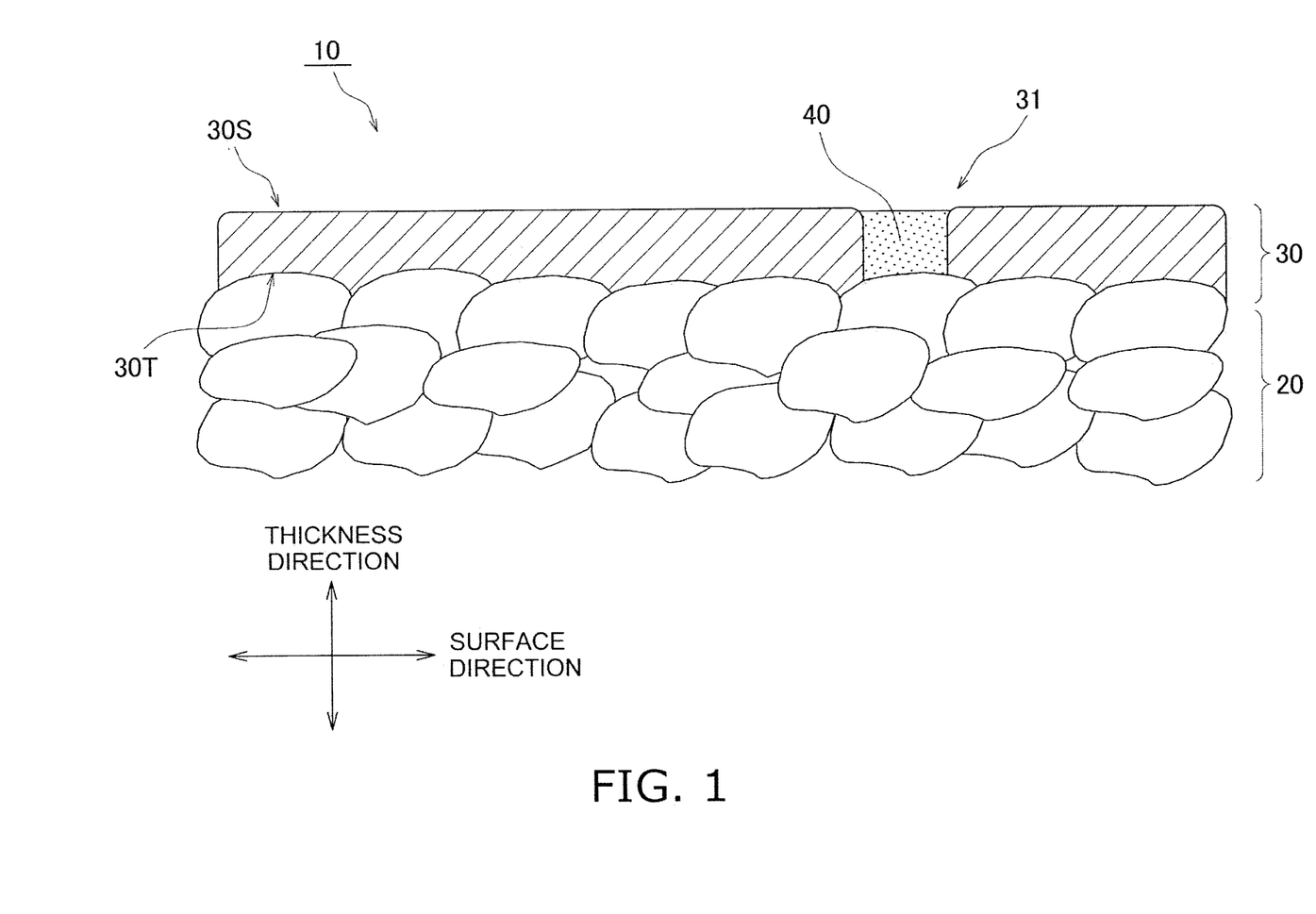
FIG. 1 is a cross sectional view of a separation membrane structure.

FIG. 1 is a cross sectional view of a separation membrane structure 10. The separation membrane structure 10 includes a support 20, a separation membrane 30 and a repair portion 40.

(1) Support 20

The support 20 supports the separation membrane 30. The support 20 exhibits chemical stability to thereby enable the formation (crystallization, coating or deposition) of the separation membrane 30 in a membrane configuration on a surface. The support 20 is a ceramic sintered body. The ceramic includes alumina, silica, mullite, zirconia, titania, yttria, silicon nitride, silicon carbide, or the like.

The support 20 may be configured in a shape to enable supply a liquid mixture, that is the object of the separation process, to the separation membrane 30. The shape of the support 20 for example may be configured in a monolithic, plate, tubular, cylindrical, columnar, or square column shape. A monolithic shape is a shape in which a plurality of cells is formed in a longitudinal direction, and is a concept that includes a honeycomb shape. When the support 20 is formed in a monolithic shape, the length in a longitudinal direction may be configured as 150 to 2000 mm, and the diameter in a radial direction as 30 to 220 mm. However there is no limitation in this regard. When the support 20 has a monolithic shape, the support 20 may include 30 to 2500 cells having a diameter of 1 to 5 mm.

The support 20 is a porous body that has a plurality of pores. The average pore diameter of the support 20 may be a size that enables transmission of a permeation component in the mixed liquid that permeates the separation membrane 30. When the average pore diameter of the support 20 takes larger values, it is possible to increase the permeation amount of the permeation component. When the average pore diameter of the support 20 takes smaller values, the strength of the support is increased and the formation of a separation membrane is facilitated since the surface of the support 20 tends to be flat. Although there is no limitation on the porosity of the support 20, it may be configured for example as 25% to 50%. Although there is no limitation on the average pore diameter of the support 20, it may be configured for example as greater than or equal to 0.01 μm and less than or equal to 25 μm. The average pore diameter of the support 20 can be measured by use of a mercury porosimeter or a perm porometer.

There is no limitation on the average particle diameter of the support 20 and it may be configured for example as greater than or equal to 5 μm and less than or equal to 100 μm. The average particle diameter of the support 20 is the value of the arithmetic mean for the respective maximum diameters of 30 particles that are measured by cross sectional observation using a scanning electron microscope (SEM).

The support 20 may be a single-layered structure having the same average pore diameter or a multilayered structure having respectively different average pore diameters. When the support 20 is a multilayered structure, the average pore diameter of each layer may become smaller in proximity to the separation membrane 30. When the support 20 is a multilayered structure, the average pore diameter of the support 20 means the average pore diameter of a layer that makes contact with the separation membrane 30. When the support 20 is a multilayered structure, each layer can be configured by at least one material that is selected from the above materials.

(2) Separation Membrane 30

The separation membrane 30 is formed on the support 20. The separation membrane 30 may be configured by an inorganic material, an organic material, a metal material, or a composite material of those materials. When taking account of thermal resistance or organic solvent resistance, an inorganic membrane such as a zeolite membrane, titania membrane, silica membrane, carbon membrane is suitable as the separation membrane 30, and a zeolite membrane that tends to exhibit a narrow distribution of pore diameters is more suitable.

The average pore diameter of the separation membrane 30 is smaller than the average pore diameter of the support 20. For example, when the separation membrane 30 is a ceramic filter used in precise filtration or ultrafiltration, the average pore diameter of the separation membrane 30 may be configured as 0.001 to 1.0 μm. The average pore diameter of the separation membrane 30 may be measured using an air flow method as prescribed in ASTM F316 (Standard Test Methods for Pore Size Characteristics of Membrane and Filters by Bubble Point and Mean Flow Pore Test) or a mercury press-in method depending on the size of the pore diameter. Furthermore, when the separation membrane 30 is a zeolite membrane having a pore formed from a ring of less than or equal to an n-membered ring, the average pore diameter of the separation membrane 30 is the arithmetic average value of the major diameter and the minor diameter of the pore. It is noted that an oxygen n-membered ring is such that the number of oxygen atoms that configure the framework that forms the pore is taken to be a number n, which includes at least one of a Si atom, Al atom and P atom, and which is a part that forms a ring structure in which the respective oxygen atoms are bound with a Si atom, an Al atom, a P atom, or the like.

When the separation membrane 30 is a zeolite membrane, there is no particular limitation to the zeolite framework structure (type), and for example it includes MFI, LTA, CHA, DDR, MOR, DOH, OFF/ERI, LTL, FER, BEA, BEC, CON, MSE, MEL, MTW, MEI, MWW, RHO, BOG, SZR, EMT, SOD, AEI, AEL, AEN, AET, AFN, AFO, AFR, AFS, AFT, AFI, AFX, ANA, CAN, GIS, GME, HEU, JBW, KFI, LAU, LEV, MAZ, MER, MFS, MTT, PHI, SFG, TUN, TON, UFI, VET, VFI, VNI, and VSV or the like. In particular, AEI, CHA, DDR, AFX, MFI, FAU, MOR, BEA, LTA, RHO that facilitate crystallization of zeolite are preferred.

The separation membrane 30 includes a plurality of defects 31. The defects 31 penetrate the separation membrane 30 in a thickness direction. The defects 31 are connected to an outer surface 30S of the separation membrane 30 and an interface 30T between the separation membrane 30 and the support 20. There is no limitation on the number of defects 31. There is no particular limitation on the average inner diameter of the defect 31, and it may be configured as greater than or equal to 5 nm and less than or equal to 10 μm. The average inner diameter of the defects 31 is the arithmetic average of the respective maximum diameters of the defects 31 in the surface direction that is orthogonal to the thickness direction.

(3) Repair Portion 40

The repair portion 40 is disposed an inner portion of the defect 31. The repair portion 40 is preferably filled into the defect 31. Closure of the defect 31 by the repair portion 40 inhibits a component other than the permeation component contained in the fluid mixture from passing through the defect 31.

The repair portion 40 is a ceramic cohesion. The ceramic includes silica, titania, alumina, mullite, zirconia, yttria, silicon nitride, silicon carbide, or the like. When handling characteristics or ease of acquisition is taken into account, silica, titania, alumina, and zirconia are preferred.

There is no particular limitation on the average particle diameter of the ceramic particles that configure the repair portion 40, and it may be configured as greater than or equal to 2 nm and less than or equal to 5 μm. The average particle diameter of the ceramic particles that configure the repair portion 40 is preferably less than the average inner diameter of the defect 31. In the present embodiment, the average particle diameter of the ceramic particles is the arithmetic average of the respective maximum diameters of 30 particles measured by observation using a scanning electron microscope (SEM) or a transmission electron microscope (TEM).

Method of Manufacture of Separation Membrane Structure 10

A method of manufacture for the separation membrane structure 10 will be described below.

(1) Formation of Support 20

Firstly starting materials for the support 20 are molded into a desired shape by use of extrusion molding, a press molding method, a slip cast method, or the like to thereby form a green body for the support 20.

Then, the green body for the support 20 is fired (for example, 900 degrees C. to 1450 degrees C.) to thereby form the support 20.

(2) Formation of Separation Membrane 30

Then, the separation membrane 30 is formed on the support 20. A method of forming the zeolite membrane and titania membrane as an example of a separation membrane 30 will be described in sequence below.

Zeolite Membrane

Firstly, after coating zeolite as a seed crystal on a surface of the support 20, the support 20 is immersed in a pressure vessel filled with a precursor solution including a silica source, an alumina source, an organic template, an alkali source, water and the like.

Next, the pressure vessel is placed in a drying oven and subjected to thermal processing (hydrothermal synthesis) for about 1 to 240 hours at 100 to 200 degrees C. to form a zeolite membrane.

Next, the support 20 formed the zeolite membrane is washed and dried at 80 to 100 degrees C.

Then, when an organic template is included in the precursor solution, the support 20 is placed in an electric furnace, and heated in an atmosphere of air at 400 to 800 degrees C. for 1 to 200 hours to thereby combust and remove the organic template. At this time, the plurality of defects 31 is produced in the resulting zeolite membrane.

Titania Membrane

Firstly, a mixture of a metal alkoxide (titanium tetraisopropoxide) and nitric acid or hydrochloric acid is mixed with water, and then further mixed with water or an alcohol premixed with nitric acid to thereby obtain a titania sol undiluted solution.

Next, a titania sol coating solution is obtained by diluting the titania sol undiluted solution with an alcohol or water.

After coating the titania sol coating solution onto a surface of the support 20, excess titania sol coating solution is removed.

Then, after drying the coated titania sol coating solution, a titania membrane is formed by heating at 400 to 500 degrees C. for 1 to 10 hours. At this time, a plurality of defects 31 is produced in the resulting titania membrane.

(3) Formation of Repair Portion 40

Preparation of Colloidal Solution

Firstly, a colloidal solution is prepared by dispersing repair material particles in an aqueous solvent. The repair material particles include ceramic particles such as silica particles, titania particles, alumina particles, mullite particles, zirconia particles, yttria particles, silicon nitride particles, silicon carbide particles, or the like.

Although there is no limitation on the average particle diameter of the repair material particles, it may be configured for example as greater than or equal to 2 nm and less than or equal to 5 μm. A configuration in which the average particle diameter of the repair material particles is greater than or equal to 2 nm inhibits diffusion of the repair material particles into the support 20. Furthermore, a configuration in which the average particle diameter of the repair material particles is less than or equal to 5 μm enables smooth inflow of the repair material particles into the defects 31.

Although there is no limitation on the concentration of the repair material particles in the colloidal solution, it is preferred to be greater than or equal to 0.01 mass % and less than or equal to 20 mass %. When the concentration of the repair material particles is greater than or equal to 0.01 mass %, it is possible for a sufficient number of repair material particles to flow into the defects 31. Furthermore, when the concentration of the repair material particles is less than or equal to 20 mass %, it is possible to inhibit excessive residual attachment of the repair material particles on the surface of the separation membrane 30.

Water may be used as a portion of the solvent in the colloidal solution but there is no requirement for all of the solution to be water. An aqueous solution means a solution that contains water. Although there is no particular limitation on the concentration of water in the colloidal solution, the proportion occupied by water in the total solution may be configured for example as greater than or equal to 50 mass % and less than or equal to 100 mass %.

pH Adjustment of Colloidal Solution

Next, the colloidal solution is adjusted to a predetermined pH. The pH of the colloidal solution is determined taking into consideration the electrical charge produced in response to the zeta potential of the repair material particles, the separation membrane 30 and the support 20. The zeta potential of the repair material particles, the separation membrane 30 and the support 20 is the zeta potential produced when those respective components come into contact with the solvent of the colloidal solution. Furthermore, the electrical charge produced by repair material particles, the separation membrane 30 and the support 20 is the electrical charge of the respective zeta potentials. Since the respective zeta potential of the support 20, the separation membrane 30, and the repair material particles that form the repair portion 40 fluctuates according to the pH of the colloidal solution, the pH of the colloidal solution must be determined to thereby establish a suitable electrical charge relationship of them.

Figure 2:
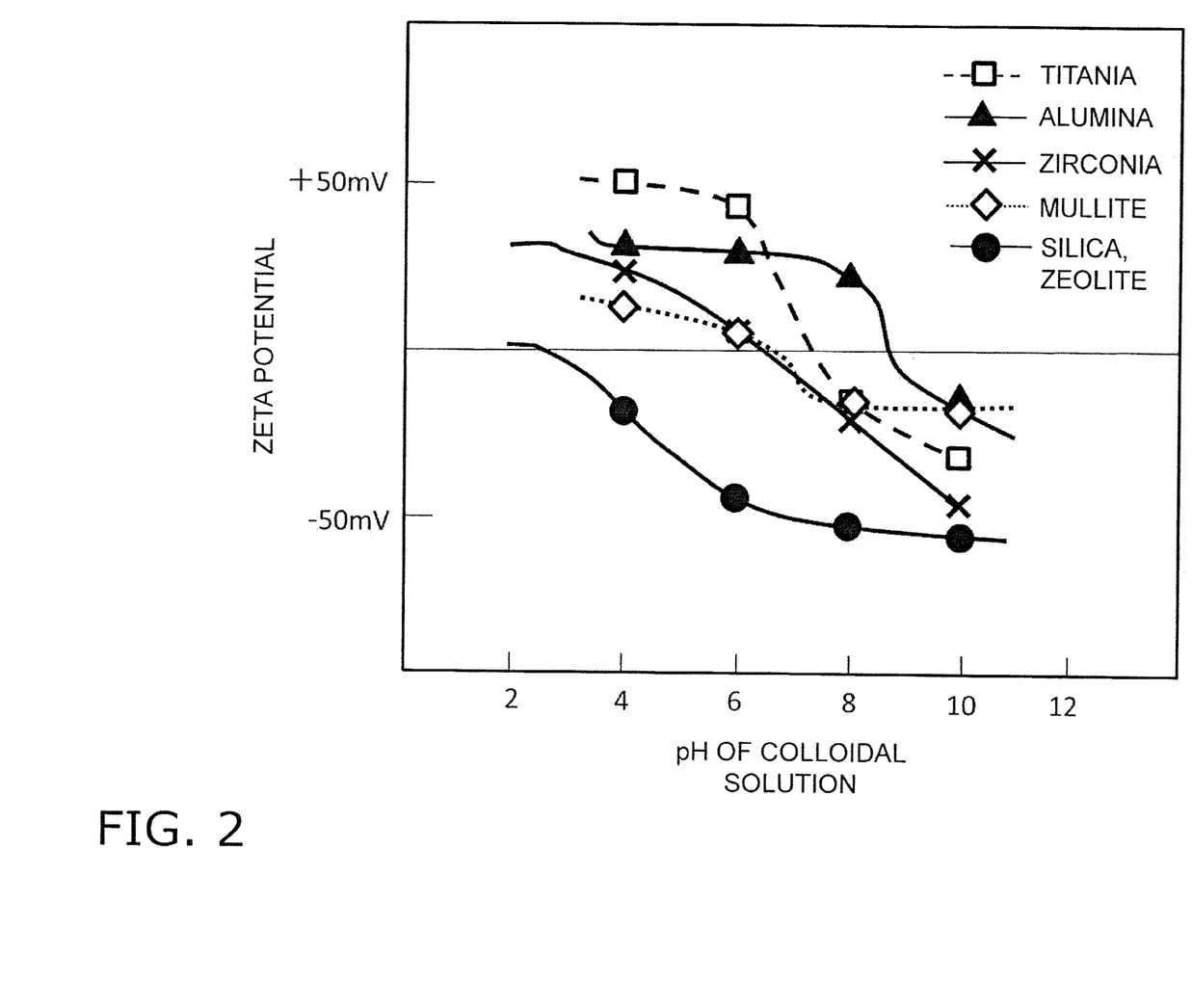
FIG. 2 is a graph illustrating the relationship between the pH of the colloidal solution and the zeta potential of the major material.

FIG. 2 is a graph illustrating the relationship between the pH of the colloidal solution and the zeta potential of the major materials. Firstly making reference to FIG. 2, a first pH range is examined in which the repair material particles exhibit a charge that is the opposite sign to the support 20. Then, within the first pH range, a second pH range is examined in which the separation membrane 30 exhibits a charge that is the same sign as the repair material particles. Furthermore, within the second pH range, a third pH range is examined in which the absolute value of the zeta potential of the separation membrane 30 is less than or equal to the absolute value of the zeta potential of the repair material particles. Although the predetermined pH of the colloidal solution may fall within the first pH range, it is preferred that it falls within the second pH range, and more preferred that it falls within the third pH range. The relationship between the zeta potential and the pH of a known colloidal solution may be used in relation to materials other than those illustrated in FIG. 2.

In this context, the first to the third pH range will be described using an example when the support 20 is configured by alumina, the separation membrane 30 is configured by titania, and the repair material particles are configured by silica particles.

Firstly, the first pH range in which alumina exhibits a positive charge and in which silica particles exhibit a negative charge is 3 to 8.5. Next, in the first pH range of 3 to 8.5, a second pH range in which titania exhibits the same negative charge as silica particles is 7 to 8.5. Then, in the second pH range of 7 to 8.5, a third pH range, in which the absolute value of the zeta potential of titania is less than or equal to the absolute value of the zeta potential of silica particles, overlaps with the second pH range of 7 to 8.5. Therefore, when the support 20 is configured by alumina, the separation membrane 30 is configured by titania, and the repair material particles are configured by silica particles, although the pH of the colloidal solution may fall within the first pH range of 3 to 8.5, it is preferred that it falls within the second and third pH range of 7 to 8.5.

Applying of Colloidal Solution

Next, a colloidal solution that is adjusted to the predetermined pH is applied onto a surface of the separation membrane 30. Although there is no limitation in relation to the method of applying the colloidal solution, it is possible to use a flow-down method or coating method.

Figure 3A:
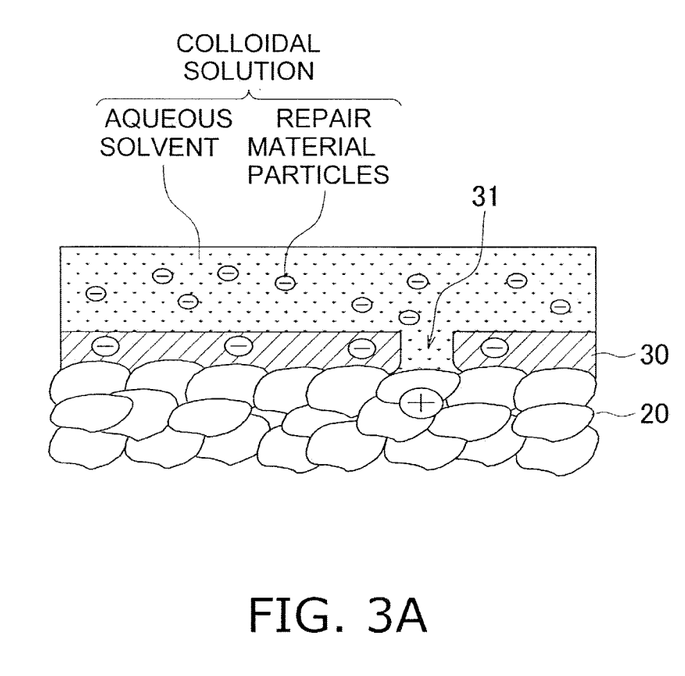
FIG. 3A and FIG. 3B describe the method of repair of the separation membrane.

As shown in FIG. 3A, the aqueous solvent in the colloidal solution comes into contact with the support 20 through the defects 31 in the separation membrane 30. Consequently, a zeta potential (reference is made to FIG. 2) inherent in the respective constituent materials is produced in the support 20, the separation membrane 30, and the repair material particles in the colloidal solution.

Figure 3B:
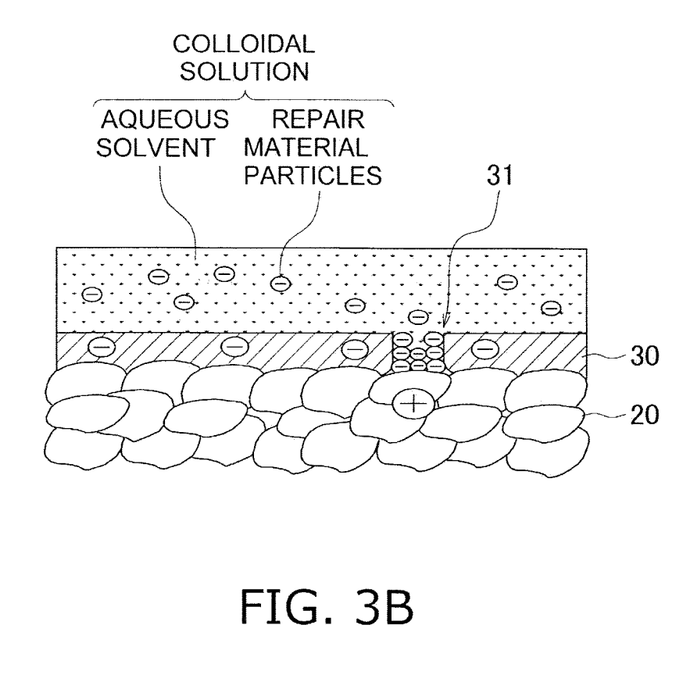

FIG. 3A illustrates an example in which the support 20 has a positive charge and the separation membrane 30 and repair material particles have a negative charge. Since the repair material particles have a charge of the opposite sign to that of the support 20, as illustrated in FIG. 3B, the repair material particles are drawn by a Coulomb force to the support 20 and are attracted into the defects 31. At this time, when the separation membrane 30 has a charge of the same sign as the repair material particles, since the repair material particles are not drawn by a Coulomb force to the separation membrane 30, the repair material particles can efficiently enter the defects 31. Furthermore, when the absolute value of the zeta potential of the separation membrane 30 is less than or equal to the absolute value of the zeta potential of repair material particles, the repair material particles can more efficiently enter the defects 31 since repulsion of the repair material particles by the separation membrane 30 can be inhibited.

Removal and Drying of Colloidal Solution

Next, excess colloidal solution that is applied onto the surface of the separation membrane 30 is removed. In this manner, residual repair material particles on the surface of the separation membrane can be reduced, and thereby it is possible to inhibit a reduction in the separation coefficient of the separation membrane 30. There is no particular limitation in the relation to the method of removing the colloidal solution, and the colloidal solution may be blown off using a blower, or the colloidal solution may be directly wiped off.

Then, the colloidal solution that has entered the defects 31 is dried. In this manner, the aqueous solvent in the colloidal solution evaporates to thereby form a repair portion 40 that is a ceramic cohesion. There is no particular limitation in the relation to the method of drying the colloidal solution, and natural drying may be performed at room temperature, or thermal processing may be performed at a temperature of less than or equal to 200 degrees C. Natural drying at room temperature enables the apparatus and processing steps to be simplified. Thermal processing at a temperature of less than or equal to 200 degrees C. enables rapid drying of the colloidal solution.

EXAMPLES

Although the examples of a separation membrane structure according to the present invention will be described below, the present invention is not thereby limited to the following examples.
Preparation of Separation Membrane Structure
(1) Sample No. 1
A separation membrane structure according to Sample No. 1 was prepared as described below.
Formation of Support
Firstly a clay was prepared by adding water, a dispersing agent and a thickener to alumina particles having an average particle diameter of 50 μm, followed by mixing and kneading.

Next, a green body for a monolithic-shaped circular columnar support was formed by extrusion molding of the resulting clay. Then, the green body was fired at 900 degrees C. to 1500 degrees C. The outer diameter of the support was 30 mm, the length of the support was 160 mm and there were 30 cells having an inner diameter of 2.3 mm.
Formation of Separation Membrane
A DDR-type zeolite membrane was formed as a separation membrane on an inner surface of the cells in Sample No. 1.

Firstly a DDR-type zeolite crystal powder was manufactured as a seed crystal based on the disclosure of M. J. den Exter, J. C. Jansen, H. van Bekkum, Studies in Surface Science and Catalysis, Vol. 84, Ed. By J. Weitkamp et al., Elsevier (1994), 1159-1166, or the disclosure of Japanese Patent Application Laid-Open No. 2004-083375. After dispersing the seed crystals in water, a seed crystal dispersion was prepared by removal of coarse crystals.

Next, the DDR concentration was adjusted to 0.001 to 0.36 mass % by diluting the seed crystal dispersion with ethanol. Next a seeding slurry was prepared by stirring at 300 rpm with a stirrer.

Next, the support was fixed to the lower end of a wide-mouthed funnel and 160 ml of the seeding slurry was allowed to flow into and pass through each cell from above the support. Then, the interior of each cell was dried by passing air for 10 minutes at an air flow rate of 3 to 6 m/s at room temperature.

Then, after placing 7.35 g of ethylenediamine (manufactured by Wako Pure Chemical Industries, Ltd.) in a fluororesin wide-mouthed flask, 1.16 g of 1-adamantaneamine (manufactured by Aldrich) was added and dissolved so that there was no residual precipitate of 1-adamantaneamine. Then, 98.0 g of 30 mass % colloidal silica (Trade name: Snowtex S, manufactured by Nissan Chemical Industries, Ltd.) and 116.5 g of ion exchanged water were added to a separate vessel and stirred gently. While the stirred colloidal silica and the ion exchanged water was added to a wide-mouthed flask, the wide-mouthed flask was subjected to strong shaking to thereby prepare precursor solution.

Next, the support with the seed crystals attached was placed in a stainless steel pressure vessel having an internal volume of 300 ml, and the precursor solution was added. Thermal processing was performed (hydrothermal synthesis) at 130 degrees C. for 14 hours to thereby form a DDR-type zeolite membrane.

Next, the DDR-type zeolite membrane was heated (atmosphere of air, 450 degrees C. for 50 hours) in an electric furnace to thereby combust and remove the 1-adamantaneamine in the pores.
Repair of Defects in Separation Membrane
In Sample No. 1, defects in the DDR-type zeolite membrane were repaired by use of a silica sol as the colloidal solution for use as a repair material.

Firstly, 0.1 g of 30 mass % colloidal silica (Trade name: Snowtex S, manufactured by Nissan Chemical Industries, Ltd.) and 299.9 g of ion exchanged water were added and stirred in a vessel to prepare a silica sol. The concentration of silica particles in the silica sol was 0.01 mass %.

Next, the pH of the silica sol was adjusted to 8 by dripping of some drops of hydrochloric acid (manufactured by Aldrich) diluted with water into the silica sol.

Then, the support was fixed to the lower end of a wide-mouthed funnel and 160 cc of the silica sol was allowed to flow into each cell from above the support to thereby apply the silica sol onto the surface of the DDR-type zeolite membrane. At that time, since the pH of the silica sol was configured as 8, the support that is configured by alumina exhibited a positive electrical charge, the silica particles of the repair material had a negative electrical charge, and furthermore, the DDR-type zeolite membrane that has a principal component of silicate exhibited a negative electrical charge (reference is made to FIG. 2). Consequently, the silica particles were drawn by a Coulomb force towards the support and the silica particles entered the defects in the DDR-type zeolite membrane.

Next, a blower was applied to the interior of the cells of the support to thereby remove excess silica sol from the DDR-type zeolite membrane. Thereafter, natural drying was allowed for 24 hours in an atmosphere of air.
(2) Sample No. 2
A separation membrane structure according to Sample No. 2 was prepared using the same steps as Sample No. 1 with the exception that the pH of the silica sol used for the repair material was adjusted to 10.

Since pH of the silica sol was configured as 10, all of the DDR-type zeolite membrane that is the separation membrane, the repair material and the support during the repair process of the defects exhibited the same negative electrical charge (reference is made to FIG. 2).
(3) Sample No. 3
A separation membrane structure according to Sample No. 3 was prepared using the same steps as Sample No. 1 with the exception that the pH of the silica sol used for the repair material was adjusted to 4.

Since pH of the silica sol was configured as 4, the relationship of the electrical charge of the separation membrane, the repair material and the support during the repair process of the defects was the same as Sample No. 1 (reference is made to FIG. 2).

(4) Sample No. 4

A separation membrane structure according to Sample No. 4 was prepared using the same steps as Sample No. 1 with the exception that the pH of the silica sol used for the repair material was adjusted to 6 and the support was formed using a aggregate of mullite particles.

Since pH of the silica sol was configured as 6, the relationship of the electrical charge of the separation membrane, the repair material and the support during the repair process of the defects was the same as Sample No. 1 (reference is made to FIG. 2).

(5) Sample No. 5

A separation membrane structure according to Sample No. 5 was prepared using the same steps as Sample No. 1 with the exception that the pH of the silica sol used for that is the colloidal solution for the repair material was adjusted to 4 and the support was formed using a aggregate of mullite particles.

Since pH of the silica sol was configured as 4, the relationship of the electrical charge of the separation membrane, the repair material and the support during the repair process of the defects was the same as Sample No. 1 (reference is made to FIG. 2).

(6) Sample No. 6

Formation of Support

Firstly, the support was formed in the same manner as Sample No. 1.

Next, silica sol liquid having an average particle diameter of 10 nm was diluted with water and PVA that is an organic binder was added to thereby prepare a sol liquid.

Then the sol liquid was allowed to flow into and through each cell from above the support to thereby form a silica UF (ultrafiltration) layer on an inner surface of the cells.

Formation of Separation Membrane

In Sample No. 6, a titania membrane was formed as the separation membrane on an inner surface of the cells.

Firstly, a mixed liquid of a metal alkoxide (titanium tetraisopropoxide) and nitric acid or hydrochloric acid was mixed with water and retained a 5 degrees C., and then further mixing was performed with isopropyl alcohol or water that was premixed with nitric acid and retained at a temperature of 25 degrees C. to thereby obtain a titania sol undiluted solution.

Next, the titania sol undiluted solution as diluted with isopropyl alcohol (IPA) or water and adjusted using a titania conversion to 0.1 mass % to thereby obtain a titania sol coating solution.

Then the support was set into a membrane-forming chamber and the titania sol coating solution was supplied by use of a feed pump from below the support at a feed rate of 1.0 L/min. When excess sol solution extruded from the top of the support, feeding of the solution was stopped, and thereafter, a discharge valve was opened and the titania sol coating solution was discharged.

Next, the support was removed from the membrane-forming chamber and shaken manually to thereby remove excess titania sol coating solution. Then, a blower was used for 10 hours to dry the interior of the cells from which the titania sol coating solution had been discharged.

Next, the support was heated in an electric furnace to 400 to 500 degrees C. at an increase rate of 100 degrees C./hr and retained at that temperature for 1 hour, and then the temperature was allowed to fall at a rate of 100 degrees C./hr to thereby form a titania membrane on the silica UF layer.

Repair of Defects in the Separation Membrane

In Sample No. 6, the defects in the titania membrane were repaired by use of the titania sol as a colloidal solution for the repair material.

Firstly, a titania sol was prepared by mixing titania and ion exchanged water in a vessel and stirring. The concentration of the titania particles in the titania sol was configured to be 0.01 mass %.

Next, the pH of the titania sol was adjusted to 6 by dripping of some drops of hydrochloric acid (manufactured by Aldrich) diluted with water into the titania sol.

Then, the support was fixed to the lower end of a wide-mouthed funnel and 160 ml of the titania sol was allowed to flow into each cell from above the support to thereby apply the titania sol onto the surface of the titania membrane. At that time, since the pH of the titania sol was configured as 6, the support that is configured by silica on its most surface layer exhibited a negative electrical charge, the titania particles of the repair material had a positive electrical charge, and furthermore, the titania membrane that is the separation membrane exhibited a positive electrical charge (reference is made to FIG. 2). Consequently, the titania particles were drawn by a Coulomb force and the titania particles entered the defects in the titania membrane.

Next, a blower was applied to the interior of the cells of the support to thereby remove excess titania sol from the titania membrane. Thereafter, natural drying was allowed for 24 hours in an atmosphere of air.

(7) Sample No. 7

A separation membrane structure according to Sample No. 7 was prepared using the same steps as Sample No. 6 with the exception that the pH of the titania sol used for the repair material was adjusted to 8.

Since pH of the titania sol was configured as 8, all of the separation membrane, the repair material and the support during the repair process of the defects exhibited the same negative charge (reference is made to FIG. 2).

(8) Sample No. 8

A separation membrane structure according to Sample No. 8 was prepared using the same steps as Sample No. 6 with the exception that the pH of the titania sol used as the colloidal solution for the repair material was adjusted to 4.

Since pH of the titania sol was configured as 4, the relationship of the electrical charge of the separation membrane, the repair material and the support during the repair process of the defects was the same as Sample No. 6 (reference is made to FIG. 2).

(9) Sample No. 9

A separation membrane structure according to Sample No. 9 was prepared using the same steps as Sample No. 6 with the exception that an alumina sol of pH 5 was used as the colloidal solution for the repair material.

Since an alumina sol of pH 5 was used, the relationship of the electrical charge of the separation membrane, the repair material and the support during the repair process of the defects was the same as Sample No. 6 (reference is made to FIG. 2). However, the absolute value of the zeta potential of the titania membrane was greater than the absolute value of the zeta potential of the alumina particles.

(10) Sample No. 10

A separation membrane structure according to Sample No. 10 was prepared using the same steps as Sample No. 6 with the exception that a zirconia sol of pH 5 was used as the colloidal solution for the repair material.

Since a zirconia sol of pH 5 was used, the relationship of the electrical charge of the separation membrane, the repair material and the support during the repair process of the defects was the same as Sample No. 6 (reference is made to FIG. 2). However, the absolute value of the zeta potential of the titania membrane was greater than the absolute value of the zeta potential of the zirconia particles.

(11) Sample No. 11

A separation membrane structure according to Sample No. 11 was prepared using the same steps as Sample No. 6 with the exception that the pH of the silica sol used as the colloidal solution for the repair material was adjusted to 4 and a UF layer was formed on an inner surface of the cells of the support by use of an alumina sol in substitution for a silica sol.

Since a silica sol of pH 4 was used, during the defect repair process, the support that was configured by alumina exhibited a positive electrical charge, the silica particles of the repair material exhibited a negative charge, and furthermore, the titania membrane that configured the separation membrane exhibited a positive charge (reference is made to FIG. 2).

(12) Sample No. 12

A separation membrane structure according to Sample No. 12 was prepared using the same steps as Sample No. 6 with the exception that the pH of the silica sol used as the colloidal solution for the repair material was adjusted 4 and the support was formed with an aggregate of zirconia particles.

Since a silica sol of pH 4 was used, during the defect repair process, the support that was confirmed by zirconia exhibited a positive electrical charge, the silica particles of the repair material exhibited a negative charge, and furthermore, the titania membrane that configured the separation membrane exhibited a positive charge (reference is made to FIG. 2).

Performance Evaluation 1

Variation in the separation coefficient and the permeation amount of the separation membrane structure before and after defect repair was evaluated in relation to Sample No. 1 to No. 5.

Firstly a mixed gas of carbon dioxide ($CO_2$) and methane ($CH_4$) (volume ratio of each gas 50=50, partial pressure of each gas 0.3 MPa) was supplied to a DDR-type zeolite membrane before defect repair. The gas that permeated the DDR-type zeolite membrane before defect repair was collected and analyzed using gas chromatography to thereby calculate a separation coefficient with reference to the formula of separation coefficient α=(permeated $CO_2$ concentration/permeated $CH_4$ concentration)/(supplied $CO_2$ concentration/supplied $CH_4$ concentration). Furthermore, the permeation flow amount of gas that has permeated the DDR-type zeolite membrane before defect repair was measured using a gas flow meter to thereby calculate a $CO_2$ permeation amount.

Then, a mixed gas of carbon dioxide and methane was supplied to a DDR-type zeolite membrane after defect repair, the gas that permeated the DDR-type zeolite membrane after defect repair was collected and analyzed using gas chromatography to thereby calculate a separation coefficient. Furthermore, the permeation flow amount of gas that has permeated the DDR-type zeolite membrane after defect repair was measured using a gas flow meter to thereby calculate a $CO_2$ permeation amount.

Then the decrease rate of the permeation amount due to defect repair and the increase rate in the separation coefficient due to defect repair were calculated. The calculation results are summarized in Table 1.

Performance Evaluation 2

The variation in a rejection rate of PEG (polyethylene glycol) by the separation membrane structure before and after defect repair was evaluated in relation to Sample No. 6 to No. 12.

Firstly a PEG aqueous solution was supplied to a titania membrane before defect repair, and a PEG rejection rate by the titania membrane was calculated based on the PEG concentration ratio in the supplied liquid and the permeating liquid.

Then a PEG aqueous solution was supplied to a titania membrane after defect repair, and the PEG rejection rate by the titania membrane was calculated based on the PEG concentration ratio in the supplied liquid and the permeating liquid.

The increase rate in the PEG rejection rate due to defect repair was calculated. The calculation results are summarized in Table 2.

TABLE 1

| Sample No. | pH of Colloidal Solution | Support Material | Support Charge | Repair Material Particle Material | Repair Material Particle Charge | Absolute Value Of Zeta Potential | Separation Membrane Material | Separation Membrane Charge | Absolute Value Of Zeta Potential | Increase Rate of Separation Coefficient (Times) | Decrease Rate of Permeation Amount (Times) |
|---|---|---|---|---|---|---|---|---|---|---|---|
| 1 | 8 | Alumina | Positive | Silica | Negative | 50 | Zeolite | Negative | 50 | 2.48 | 0.99 |
| 2 | 10 | Alumina | Negative | Silica | Negative | 55 | Zeolite | Negative | 55 | 1.33 | 0.96 |
| 3 | 4 | Alumina | Positive | Silica | Negative | 20 | Zeolite | Negative | 20 | 2.35 | 0.98 |
| 4 | 6 | Mullite | Positive | Silica | Negative | 45 | Zeolite | Negative | 45 | 2.21 | 0.98 |
| 5 | 4 | Mullite | Positive | Silica | Negative | 20 | Zeolite | Negative | 20 | 2.19 | 0.99 |

TABLE 2

| Sample No. | pH of Colloidal Solution | Support Material | Support Charge | Repair Material Particle Material | Repair Material Particle Charge | Absolute Value Of Zeta | Separation Membrane Material | Separation Membrane Charge | Absolute Value Of Zeta | Increase Rate in PEG Rejection Rate (Times) |
|---|---|---|---|---|---|---|---|---|---|---|
| 6 | 6 | Silica | Negative | Titania | Positive | 45 | Titania | Positive | 45 | 1.21 |
| 7 | 8 | Silica | Negative | Titania | Negative | 15 | Titania | Negative | 15 | 1.01 |

TABLE 2-continued

| Sample No. | pH of Colloidal Solution | Support Material | Support Charge | Repair Material Particle Material | Repair Material Particle Charge | Repair Material Particle Absolute Value Of Zeta | Separation Membrane Material | Separation Membrane Charge | Separation Membrane Absolute Value Of Zeta | Increase Rate in PEG Rejection Rate (Times) |
|---|---|---|---|---|---|---|---|---|---|---|
| 8 | 4 | Silica | Negative | Titania | Positive | 50 | Titania | Positive | 50 | 1.18 |
| 9 | 5 | Silica | Negative | Alumina | Positive | 35 | Titania | Positive | 47 | 1.09 |
| 10 | 5 | Silica | Negative | Zirconia | Positive | 20 | Titania | Positive | 47 | 1.08 |
| 11 | 4 | Alumina | Positive | Silica | Negative | 20 | Titania | Positive | 50 | 1.04 |
| 12 | 4 | Zirconia | Positive | Silica | Negative | 20 | Titania | Positive | 50 | 1.05 |

As shown in Table 1, there was an increase in the separation coefficient in Sample No. 1 and 3 to 5 in which the repair material particles exhibited an electrical charge of an opposite sign to the support. Furthermore, as shown in Table 2, there was an increase in the PEG rejection rate in Sample No. 6, and 8 to 12 in which the repair material particles exhibited an electrical charge of an opposite sign to the support. This feature is due to the fact that the repair material particles are drawn into the support by a Coulomb force and thereby are selectively attracted into the defects in the separation membrane. As shown in Table 1, in Sample No. 1, and 3 to 5, the permeation amount was confirmed to be maintained even after repair.

Furthermore, as shown in Table 2, there was a further increase in the PEG rejection rate in Sample No. 6, and 8 to 10 in which the separation membrane exhibited an electrical charge having the same sign as the repair material particles. This feature is due to the fact that more repair material particles could be supplied to defects by inhibiting the repair material particles from being drawn to the separation membrane by a Coulomb force.

Furthermore, as shown in Table 2, there was a further increase in the PEG rejection rate in Sample No. 6 and 8 in which the absolute value of the zeta potential of the separation membrane did not exceed the absolute value of the zeta potential of the repair material particles. This feature is due to the fact that the repair material particles could be smoothly supplied to the defects by inhibiting repulsion with respect to the repair material particles by a Coulomb force due to the separation membrane.

Performance Evaluation 3

Sample No. 1-1 to 1-6 were prepared to thereby examine an effect on the permeation amount and separation coefficient of the concentration of the repair material particles in the colloidal solution used for repair.

The preparation steps for Sample No. 1-1 to 1-6 were the same as those for Sample No. 1 with the exception that the concentration of the repair material particles in the colloidal solution used for repair was varied as shown in Table 3.

The variation in the separation coefficient and the permeation amount of the separation membrane structure before and after defect repair was evaluated in relation to Sample No. 1-1 to 1-6.

Firstly a mixed gas of carbon dioxide ($CO_2$) and methane ($CH_4$) (volume ratio of each gas 50=50, partial pressure of each gas 0.3 MPa) was supplied to a DDR-type zeolite membrane before defect repair, the gas that permeated the DDR-type zeolite membrane before defect repair was collected and analyzed using gas chromatography to thereby calculate a separation coefficient with reference to the formula of separation coefficient $\alpha$=(permeated $CO_2$ concentration/permeated $CH_4$ concentration)/(supplied $CO_2$ concentration/supplied $CH_4$ concentration). Furthermore, the permeation flow amount of gas that has permeated the DDR-type zeolite membrane before defect repair was measured using a gas flow meter to thereby calculate a $CO_2$ permeation amount.

Then, a mixed gas of carbon dioxide and methane was supplied to a DDR-type zeolite membrane after defect repair, the gas that permeated the DDR-type zeolite membrane after defect repair was collected and analyzed using gas chromatography to thereby calculate a separation coefficient. Furthermore, the permeation flow amount of gas that has permeated the DDR-type zeolite membrane after defect repair was measured using a gas flow meter to thereby calculate a $CO_2$ permeation amount.

Then the decrease rate of the permeation amount due to defect repair and the increase rate in the separation coefficient due to defect repair were calculated. The calculation results are summarized in Table 3.

TABLE 3

| Sample No. | Concentration of Repair Material Particles in Colloidal Solution (wt %) | Increase Rate in Separation Coefficient (Times) | Decrease Rate Permeation Amount (%) |
|---|---|---|---|
| 1-1 | 0.005 | 1.78 | −0.48 |
| 1-2 | 0.01 | 2.48 | −1.32 |
| 1-3 | 0.1 | 2.33 | −0.76 |
| 1-4 | 1 | 2.29 | −1.17 |
| 1-5 | 20 | 2.38 | −3.67 |
| 1-6 | 30 | 2.19 | −7.55 |

As shown in Table 3, there was an increase in the separation coefficient when the concentration of the repair material particles in the colloidal solution was greater than or equal to 0.01 mass %. This feature is due to the fact that a larger number of repair material particles were supplied to the defect in the separation membrane as a result of inclusion of a sufficient number of repair material particles in the colloidal solution.

As shown in Table 3, a reduction in the permeation amount could be inhibited by a configuration in which the concentration of the repair material particles in the colloidal solution was less than or equal to 20 mass %. This feature is due to the fact that repair material particles that attach to and remain on the surface of the separation membrane could be inhibited by a configuration in which an excessive number of repair material particles is not included in the colloidal solution.

The invention claimed is:

1. A repair method for a separation membrane comprising:

forming a repair portion in a defect of the separation membrane by applying a colloidal solution to a surface of a separation membrane formed on a support, wherein the colloidal solution has a predetermined pH, in the colloidal solution, repair material particles are dispersed in an aqueous solvent, the repair material particles have an electrical charge that is opposite to an electrical charge of the support at the predetermined pH, the repair material particles are at least one selected from the group consisting of silica particles, titania particles, alumina particles, mullite particles, zirconia particles, yttria particles, silicon nitride particles and silicon carbide particles, and the repair portion is a ceramic aggregate which is composed of at least one selected from the group consisting of silica particles, titania particles, alumina particles, mullite particles, zirconia particles, yttria particles, silicon nitride particles and silicon carbide particles.

2. The repair method for a separation membrane according to claim 1, wherein the separation membrane has an electrical charge that is the same as the electrical charge of the repair material particles at the predetermined pH.

3. The repair method for a separation membrane according to claim 2, wherein an absolute value of a zeta potential of the separation membrane is less than or equal to a zeta potential of the repair material particles at the predetermined pH.

4. The repair method for a separation membrane according to claim 2, wherein a concentration of the repair material particles in the colloidal solution is greater than or equal to 0.01 mass % and less than or equal to 20 mass %.

5. The repair method for a separation membrane according to claim 1, further comprising drying the colloidal solution.

6. The repair method for a separation membrane according to claim 5, wherein the colloidal solution is dried naturally.

7. The repair method for a separation membrane according to claim 5, wherein the colloidal solution is subjected to thermal processing at less than or equal to 200° C.

8. A method of manufacture of a separation membrane structure comprising:

forming a separation membrane on a porous support, and forming a repair portion in a defect of the separation membrane by applying a colloidal solution to a surface of the separation membrane, wherein the colloidal solution has a predetermined pH, in the colloidal solution, repair material particles are dispersed in an aqueous solvent, the repair material particles have an electrical charge that is opposite to an electrical charge of the support at the predetermined pH, the repair material particles are at least one of silica particles, titania particles, alumina particles, mullite particles, zirconia particles, yttria particles, silicon nitride particles and silicon carbide particles, and the repair portion is a ceramic aggregate which is composed of at least one selected from the group consisting of silica particles, titania particles, alumina particles, mullite particles, zirconia particles, yttria particles, silicon nitride particles and silicon carbide particles.

* * * * *